United States Patent [19]

Pham et al.

[11] 4,066,933
[45] Jan. 3, 1978

[54] STATIC SWITCHING DEVICE FOR TWO DIRECT CURRENT MACHINES

[75] Inventors: Quang Minh Pham, Elancourt; Jacques Soffer, Sceaux, both of France

[73] Assignee: Societe Generale de Constructions Electriques et Mecaniques Alsthom, Paris, France

[21] Appl. No.: 636,950

[22] Filed: Dec. 2, 1975

[30] Foreign Application Priority Data

Dec. 5, 1974  France .................................. 74.39838

[51] Int. Cl.² .......................... H02P 3/00; H02P 7/68
[52] U.S. Cl. ...................................... 318/60; 318/87; 318/89; 318/112
[58] Field of Search ............... 318/87, 88, 89, 60, 318/112

[56] References Cited

U.S. PATENT DOCUMENTS

| 1,136,621 | 4/1915 | Shallcross | 318/87 |
|---|---|---|---|
| 1,317,284 | 9/1919 | Ferris | 318/88 |
| 2,130,858 | 9/1938 | Riley | 318/89 |
| 3,800,197 | 3/1974 | Mehta | 318/87 |

FOREIGN PATENT DOCUMENTS 1,395,380  5/1975  United Kingdom ................. 318/112

*Primary Examiner*—B. Dobeck
*Assistant Examiner*—Eugene S. Indyk
*Attorney, Agent, or Firm*—Haseltine, Lake & Waters

[57] ABSTRACT

Static switching device for two machines making it possible to effect anti-skid control during drive operation and the controlling of the braking torque during brake operation. It comprises two circuits in parallel on the direct current source, a first circuit comprising, in the following order, a first chopper, a first smoothing inductance, an inductance of the first machine, a first distributing thyristor and an armature of the first machine and a second circuit comprising, in the following order, an armature of the second machine, a second distributing thyristor, a second smoothing inductance and an inductance of the second machine, the two circuits being connected together by two connections arranged on either side of the said first and second distributing thyristors, each of the connections bearing a distributing thyristor. Applications — Controlling of electric motors used for the propulsion of vehicles.

3 Claims, 5 Drawing Figures

STATIC SWITCHING DEVICE FOR TWO DIRECT CURRENT MACHINES

The invention concerns an electronic device for controlling two direct-current series energized machines used in the electric propulsion of vehicles; electric machines operate either in the drive mode, the machines operating as motors, or in the brake mode by rheostatic recovery or braking, the machines operating as generators.

It is a known method to allow switching from the drive mode to the brake mode and vice-versa by means of electronic components. Known devices use a single chopper for the two machines: each of the armatures of the machine and its inductor is arranged in series with a smoothing armature and a chopper common to the terminals of the direct current source. The disadvantage resulting from this is that the device according to prior art does not make it possible to control, during driving, the two motors separately, hence the impossibility of effecting proper anti-skidding of the wheels, nor does it allow the two machines to be made independent during braking, hence the impossibility of controlling separately the braking torque of each of the two generators.

The switching device according to the invention makes it possible to overcome these disadvantages. In the latter, indeed, the circuits of the machines in the braking mode and in the driving mode are independent from one machine to another, thus allowing automatic anti-skidding of the wheels and controlling of the braking couple of the two machines.

The present invention has as its object a device for the static switching of two direct current machines operating as motors or generators, characterized in that it comprises two circuits in parallel on the terminals of the direct current source, the first circuit comprising, in series and in the following order, a first chopper, a first smoothing inductance, an inductor of the first machine, a first distributing thyristor and an armature of the said first machine, the second circuit comprising, in series and in the following order, an armature of the second machine, a second distributing thyristor, an inductor of the second machine, a second smoothing inductance and a second chopper, in that moreover, the two circuits are connected together by two connections arranged on either side of the said first and second distributing thyristors, the said first connection comprising a third distributing thyristor, the said second connection comprising a fourth distributing thyristor, the device comprising, moreover, an electronic control unit sending out control pulses to the triggers of the said distributing thyristors and to those of the said first and second choppers.

According to one particularity of the invention, each of the said inductors of the said machines is connected at its ends, on the one hand, to a mid point of the secondary coil of a transformer, on the other hand, to a resistor whose other end is connected to the anodes of two thyristors each of whose cathodes is connected up to one of the ends of the windings of the said secondary coil, the primary coil of the said transformer being fed by an alternating current generator.

According to another particularity of the invention, the said first and second connections each comprise the said third or the said fourth distributing thyristor with which a resistor is connected up in series to the terminals of which a short-circuit thyristor is connected, is connected up in series.

With reference to the accompanying diagrammatic figures 1 to 5, an example of embodiment of the present invention will be described hereinbelow, that example being given purely by way of illustration and having no limiting character. The same elements shown in several of these figures bear, in all of these, the same references.

Figure 1:
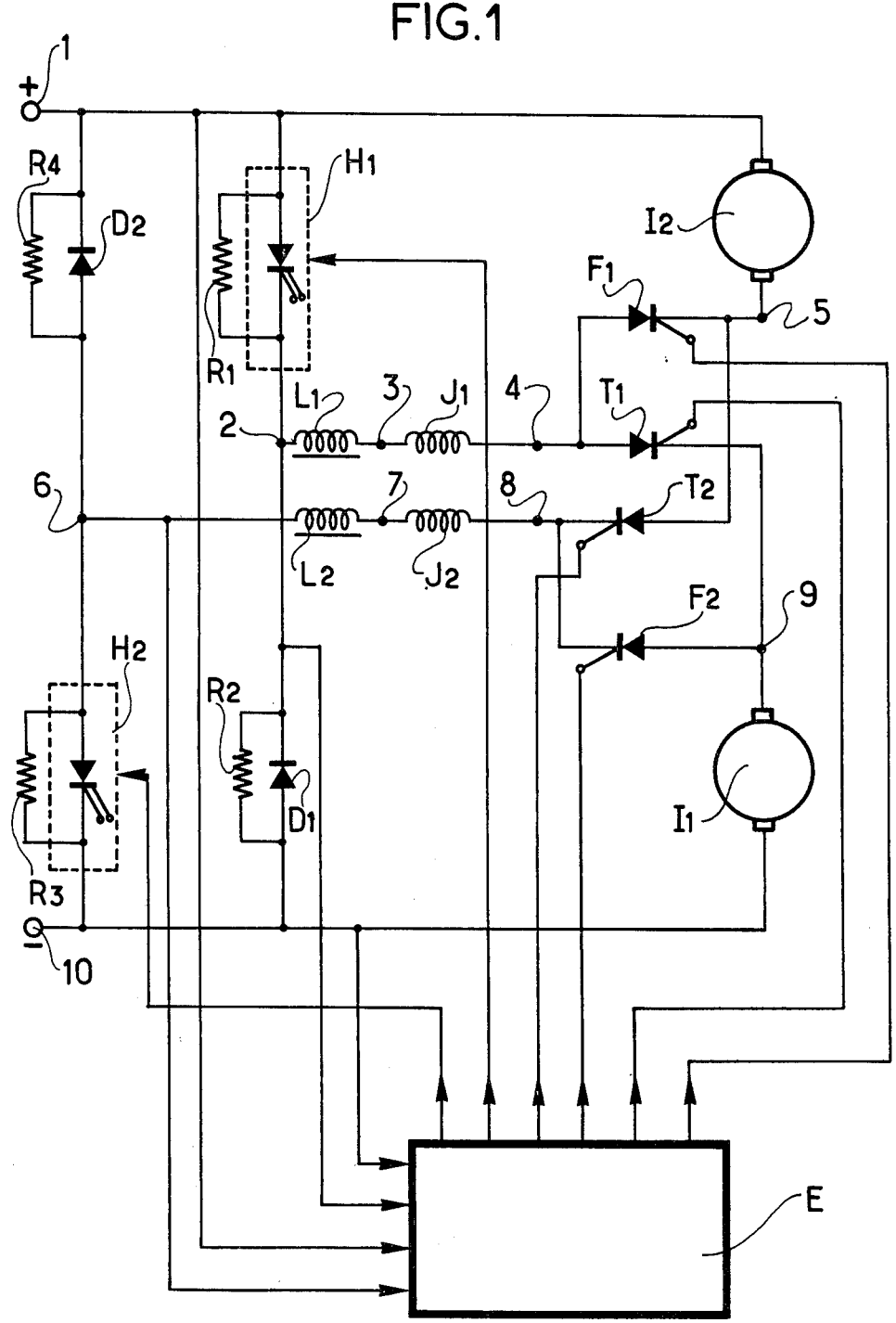
FIG. 1 shows the diagram of the switching device of two electric machines suitable for operating as motors or generators.

The characteristics of the first variant of the invention will become apparent from the description made with reference to FIG. 1. The rectangle H1 in discontinuous lines represents a main thyristor provided with its extinguishing circuit. The circuit H1, the diode D1 and the smoothing inductance L1 constitute the first chopper. The second chopper comprises the circuit H2 identical to H1, the diode D2 and the smoothing inductance L2. The elements F1, F2, T1 and T2 represent distributing thyristors. R1, R2, R3 and R4 constitute four identical resistors having a high value. I1 and I2 designate the armatures of the direct current machines having energizing windings J1 and J2. The logic control unit is represented by E.

For operation in the drive mode, the thyristors T1 and T2 are made conductive permanently and the thyristors F1 and F2 are in the blocked state separating respectively 4 from 5 and 8 from 9. The first traction circuit comprises the circuit H1, the diode recovery diode D1, the thyristor T1 in the permanent conduction state, the smoothing inductance L1, the resistors R1 and R2, the armature I1 and the series energizing coil J1. It operates as a step-down transformer type of chopper, follows: H1 is actuated by means of an electronic control signal supplied by E periodically at the period T and remains conductive during a time $\alpha T$, with the ratio $\alpha$ adjustable between zero and one. T is the chopping period and $\alpha$ is the cyclic ratio. The circuit (L1, J1, T1 and I1) is thus subjected to a voltage equal to the direct current feed voltage during a period $\alpha T$ and to a zero voltage during a period equal to $(1 - \alpha)T$, the adjusting of the ratio makes it possible to obtain, at the terminals of the armature, a random voltage comprised between a very low value and a value close to the feed voltage. When H1 is in the conductive state, the motor current is increasing; when it is blocked, the motor current decreases. The motor current, being of an inductive kind, cannot be interrupted at the time $t = \alpha T$; the recovery diode D1 then ensures the flow of the current in the motor, when the circuit H1 is blocked.

The second electronic drive circuit is composed of the circuit H2, the recovery diode D2, the thyristor T2 in the permanently conductive state, the smoothing inductance L2, the resistors R3 and R4, the armature I2 and the inductor J2. Its operation is identical to that of the first drive circuit.

When operating in the drive mode, the two power circuits (H1, D1, T1, L1, R1, R2, I1, J1) and (H2, D2, T2, L2, R3, I4, I2, J2) can operate independently from each other.

The static passing from the drive operation mode to the braking mode by recovery or rheostatic braking is effected as follows: the control logic circuit E sends out an extinguishing order to the circuits H1 and H2 and cancels the firing signals for the thyristors T1 and T2. The motor currents become cancelled in the two drive circuits, the thyristors T1 and T2 are extinguished by the lack of current after an interval of time greater than their natural unpriming time. When all the thyristors in the figure are extinguished, the logic control circuit E measures cancelled currents in the motors and differences in potential of the points 2 and 6 in relation to the point 10 equal to half the value of the direct current feed voltage; it then allows electric braking by the permanent applying of firing signals for the thyristors F1 and F2. The two electric braking circuits in which the current choppers operate as boosters and the direct current machines operate as generators are thus obtained: the first circuit for braking by recovery comprises the circuit H1, the diode D1, the smoothing inductance L1, the energizing coil J1, the thyristor F1 and the armature I2; the circuit H2, the diode D2, the smoothing inductance L2, the energizing coil J2, the thyristor F2 and the armature I1 compose the second electric braking circuit.

The two braking circuits are independent from each other. The first braking circuit operates as follows: the direction of the current in the energizing coil J1 being the same as in the drive mode, the remanent magnetism enables the priming of the machine as a generator. The armature I2 in rotation has an electromotive force at its terminals having the same polarity as that existing in the drive mode, that is, opposite to the feed voltage. By making H1 and F1 conductive, a current is set up in the circuit (1, H1, 2, L1, 3, J1, 4, F1, 5, I2, 1) whose sign is opposite to that of the drive current in the armature I2 and in the same direction as that of the drive current in the energizing coil J1, the smoothing inductance L1 and the circuit H1; that current increases in absolute value until the circuit H1 receives a blocking order at the instant $t = \alpha T$; it then closes again across 10, D1, 2, L1, 3, J1, 4, F1, I2 and across the plus terminal of the direct-current voltage which thus recovers some of the energy.

The reversing of the sign of the electromagnetic torque necessary for passing from the drive mode to the brake mode is thus effected by reversing the direction of the current in the armature I2. The circuit H1 operates periodically at the period T and remains conductive during a time $\alpha T$ with the ratio $\alpha$ comprised between zero and one. The current sent back to the supply line is worth zero during the period $\alpha T$ of conductivity of the circuit H1 and is equal to the current of the generator during the blocking time $(1 - \alpha)T$ of H1; its average value is proportional to $(1 - \alpha)$.

The second electric braking circuit (H2, D2, L2, J2, F2) operates in an identical way to the first.

Figure 2:
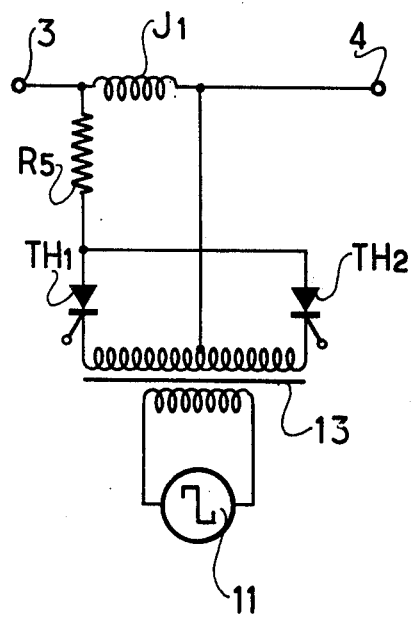
FIGS. 2 and 3 show diagrams of the pre-magnetizing circuits of the inductors of the machines.
Figure 3:
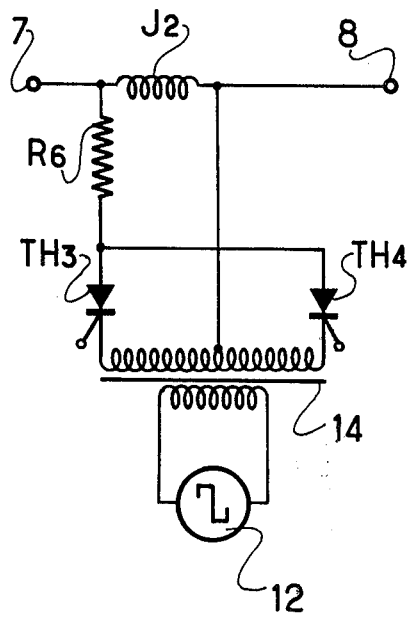

A second variant of the invention applies to the case where the characteristics of the direct current machine are such that at low speed the remanent flux of the machine is not sufficient to ensure its priming as a series-connected generator: it is necessary, at the beginning of the braking, to pre-magnetize the energizing J1 (and J2) by a circuit such as that in FIG. 2 (and FIG. 3) comprising a resistor R5 (and R6) a thyristor bridge TH1 and TH2 (TH3 and TH4) at the terminals of the secondary coil and a transformer 13 (and 14) having a mid point and an alternating current source 11 (and 12) at the terminals of the primary winding of the same transformer.

Figure 4:
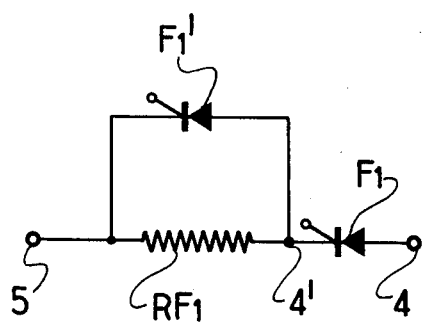
FIGS. 4 and 5 show modified diagrams of a switching thyristor making it possible to avoid surge in the generator.
Figure 5:
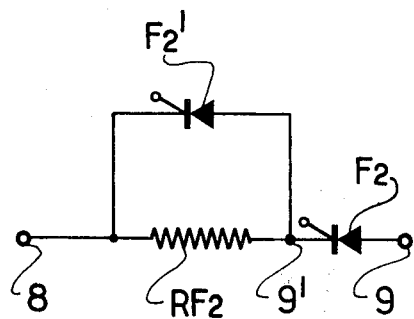

The electromotive force developped by the generator at the end of the interval of time $\alpha T$, reduced by the ohmic drops in the direct current machine, must be less than the value of the direct current supply voltage, a condition which it is often difficult to fulfill when braking, by recovery at very high speed. A third form of the invention, to maintain performances at very high speed, includes a modification of the circuit 4, F1, 5 (and 8, F2, 9) according to FIG. 4 (and FIG. 5), in which a resistor RF1 (and RF2) is brought into the circuit when braking at very high speed, this resistor being one which can be short-circuited by a thyristor F1' (and F2') made conductive, when, the speed of the vehicle having sufficiently decreased, there is no longer any danger of electric surge of the series-connected generator.

The electronic switching from the electric brake mode to the drive operation mode is effected by controlling the blocking of the circuits H1 and H2 and by cancelling the firing pulses for the thyristors F1 and F2. When all the thyristors in FIG. 1 are blocked, the logic control unit E measures zero currents in the machines and differences in potential between the points 2 and 6 in relation to the point 10 which are equal to half the value of the direct current supply voltage. The device is then ready to operate in the traction mode, keeping to the above-described sequences.

In an electric transmission chain comprising drive wheels, the present invention makes it possible to control and limit the difference in speed between the drive wheels; on the other hand, it enables, due to the possibility of controlling independently the torque of each drive wheel, the electronic adjusting of the difference between the torques of the drive wheels, hence the electronic guiding of the direction of propulsion of the vehicle itself.

The present invention remains applicable in the case of direct current machines comprising separate energizing means; it can be applied to the case where each of the elements H1, H2, T1, T2, F1, F2, F1', F2', TH1, TH2, TH3 and TH4 can be constituted either by a controlled semi-conductor type or thyristor type rectifier, or by a power transistor, or by a component having the operational characteristics of a controlled electric valve. Lastly, the electric brake mode can be either by recovery, or by rheostat, or by a mixed solution which consists in substituting rheostatic braking for braking by recovery, when the recovery of power is not possible.

We claim:

1. Control system for solid state switching of two direct current machines operating as motors or generators, comprising two circuits connected in parallel on the terminals of a direct current source, the first circuit comprising, in series and in the following order, a first chopper, a first smoothing inductance, a field winding in the first machine, a first switching thyristor and an armature in the said first machine, the second circuit comprising, in series and in the following order, an armature in the second machine, a second switching thyristor, a field winding in the second machine, a second smoothing inductance and a second chopper, first and second connections for connecting the two circuits together, the first connection connecting the anodes of said first and second switching thyristors, the second connection connecting the cathodes of said first and second switching thyristors, the first connection comprising a third switching thyristor, the second connection comprising a fourth switching thyristor, the system comprising an electronic control unit transmitting control pulses to the triggers of said switching thyristors and to those of said first and second choppers for operating the machines as motors or generators.

2. Device according to claim 1, characterized in that each of the said inductors of the said machines is connected at its ends, on the one hand, to a mid point of the secondary coil of a transformer, on the other hand, to a resistor whose other end is connected to the anodes of two thyristors each of whose cathodes is connected up to one of the ends of the windings of the said secondary coil, the primary coil of the said transformer being fed by an alternating current generator.

3. A control system as defined in claim 1 wherein said first and second connections include a series-connected resistor, and a short-circuit thyristor connected to the terminals of said series-connected resistor.

* * * * *